United States Patent [19]

Pascouet

[11] Patent Number: 4,949,315

[45] Date of Patent: Aug. 14, 1990

[54] EXTERNAL BUBBLE-SUPPRESSION METHOD AND APPARATUS

[76] Inventor: Adrien P. Pascouet, 3, Tex.

[21] Appl. No.: 389,361

[22] Filed: Aug. 3, 1989

Related U.S. Application Data

[60] Division of Ser. No. 118,430, Nov. 6, 1987, Pat. No. 4,875,545, which is a continuation-in-part of Ser. No. 703,342, Feb. 20, 1985, abandoned.

[51] Int. Cl.$^5$ ............................................. H04R 23/00
[52] U.S. Cl. ..................................... 367/144; 181/115; 181/120
[58] Field of Search .................. 367/144; 181/115, 120

[56] References Cited

U.S. PATENT DOCUMENTS

| | | | |
|---|---|---|---|
| 2,599,245 | 6/1951 | Finn | 181/0.5 |
| 2,619,186 | 11/1952 | Carlisle | 181/0.5 |
| 2,771,961 | 11/1956 | Blake | 181/0.5 |
| 3,437,170 | 4/1969 | Brock . | |
| 3,500,949 | 3/1970 | Paterson | 181/0.5 |
| 3,601,216 | 8/1971 | Mott-Smith . | |
| 3,653,460 | 4/1972 | Chelminski | 181/0.5 |
| 3,739,869 | 6/1973 | Mayne | 181/0.5 |
| 3,804,194 | 4/1974 | Umphenour et al. | 181/0.5 |
| 3,805,914 | 4/1974 | Havlik et al. | 181/0.5 |
| 4,735,281 | 4/1988 | Pascouet | 181/115 |

FOREIGN PATENT DOCUMENTS 2535469  10/1982  France .

Primary Examiner—Charles T. Jordan
Assistant Examiner—J. Woodrow Eldred
Attorney, Agent, or Firm—Arnold, White & Durkee

[57] ABSTRACT

The novel method substantially reduces the pressure pulse, generated by a first radial motion of a body of water, by changing the radial motion into axial motion. The change from radial motion into axial motion is produced by generating a second radial motion of opposite phase within the body of water.

The method can be used to substantially reduce the pressure pulse, generated by the implosion of a body of water, by generating an explosion in the body of water. It can also substantially reduce the pressure pulse generated by an explosion within a body of water, by generating an implosion of the body of water. The method can further be used to generate within a body of water an impulsive acoustic signal by sequentially generating within the body of water a first explosion and a second explosion. The apparatus comprises a signal chamber which contains a first charge of gas. A normally-closed valve maintains the signal chamber closed and has a discharge port into the water. A second chamber contains a second charge of compressed gas. A second fast-acting valve normally maintains the second chamber closed and has an outlet into the water. A controller explosively opens the first valve so as to generate an impulsive acoustic signal and a first bubble. The controller subsequently opens the second valve to thereby release the second charge from the second chamber into the water, while the first bubble is near is maximum volume.

8 Claims, 9 Drawing Sheets

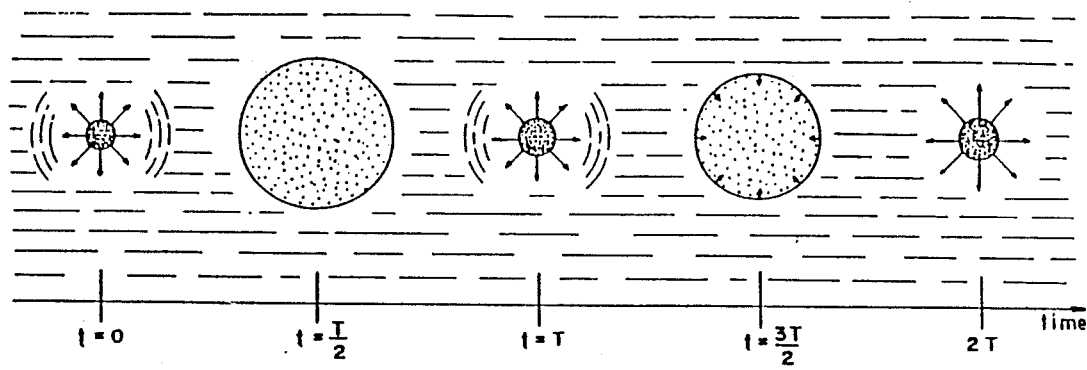
FIG. 1.
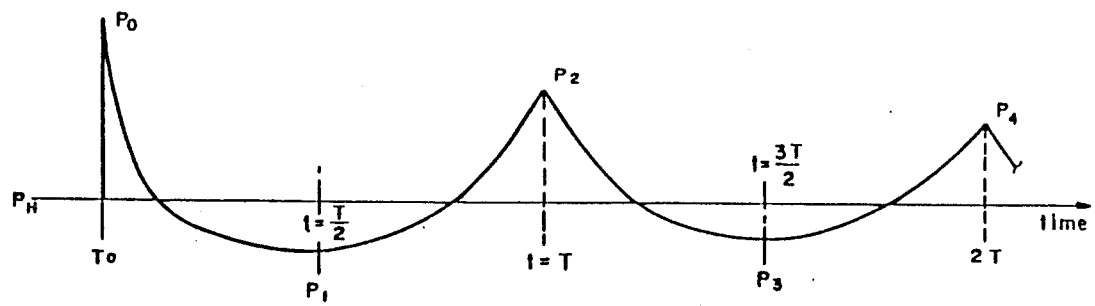
FIG. 2.
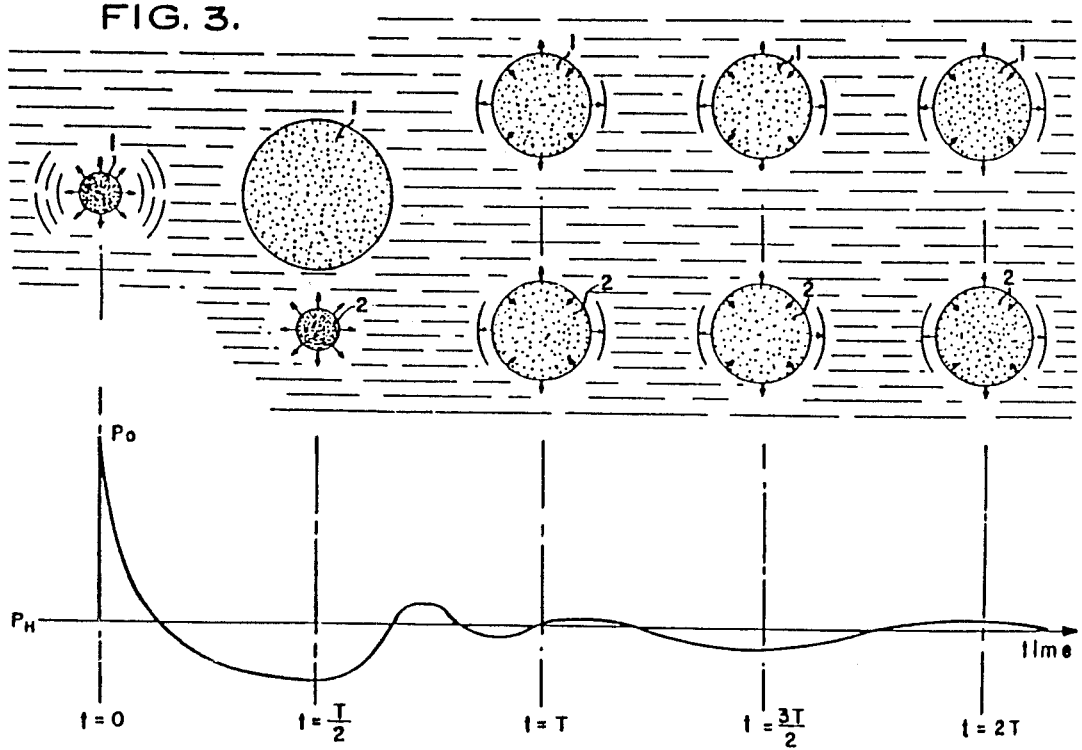
FIG. 3.
FIG. 4.

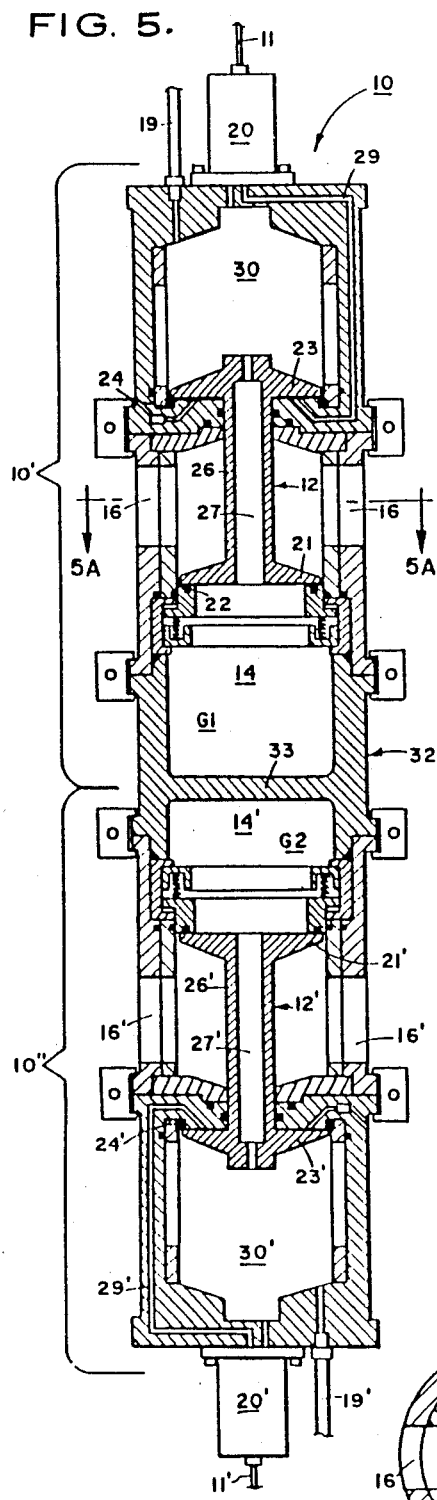
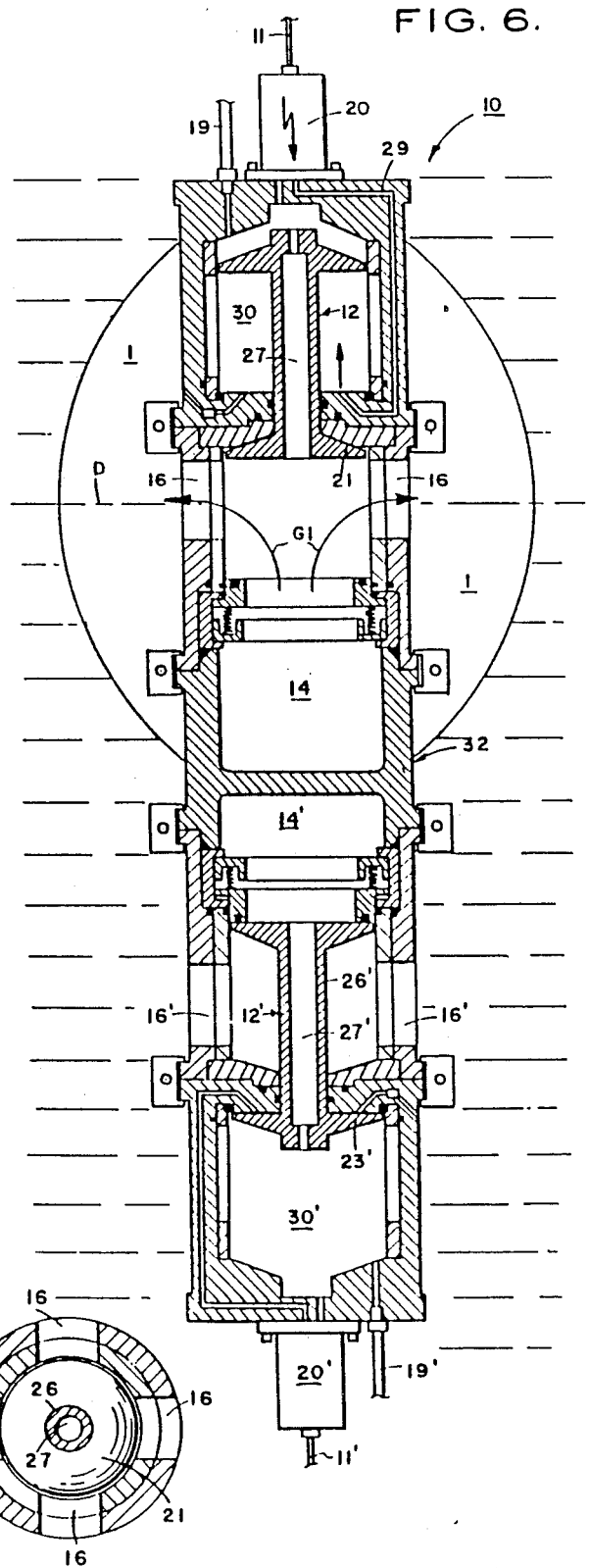
FIG. 5.    FIG. 6.
FIG. 5A.

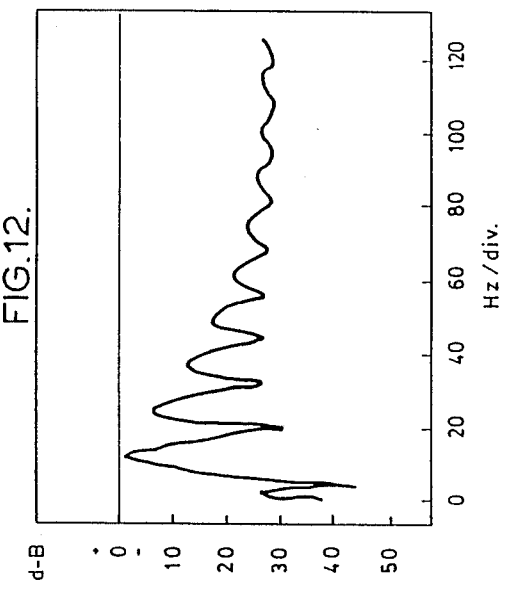
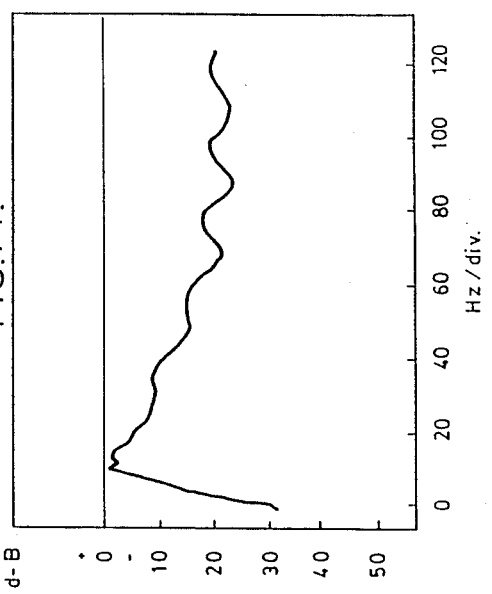
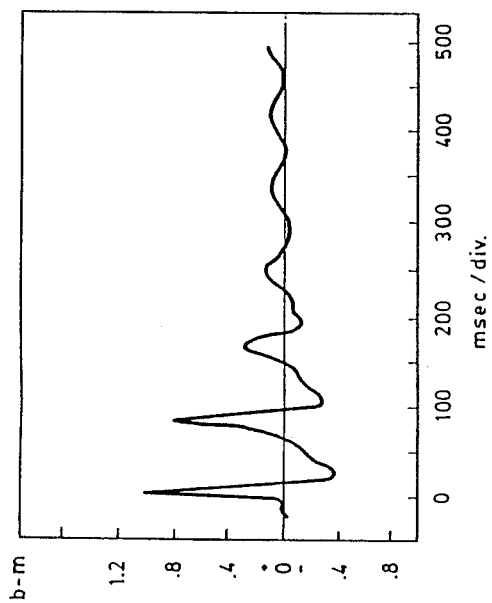
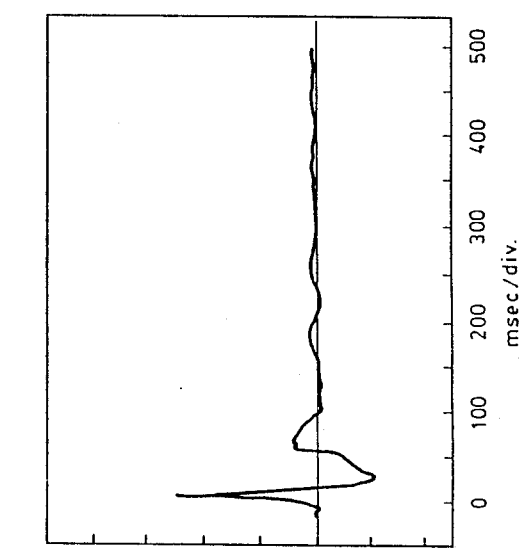

EXTERNAL BUBBLE-SUPPRESSION METHOD AND APPARATUS

CROSS REFERENCE TO RELATED APPLICATIONS

This application is a division of application Ser. No. 07/118,430 filed Nov. 6, 1981 now U.S. Pat. No. 4,875,545, which is a continuation in part of Applicant's copending application Ser. No. 703,342, now abandoned. The disclosure of the parent application, filed Feb. 20, 1985, is hereby incorporated by reference.

BACKGROUND OF THE INVENTION

2. Field of the Invention

The present invention generally relates to a method and apparatus for generating underwater sharp, impulsive acoustic signals, which are especially useful in marine seismic exploration and, in particular, to such acoustic sources which periodically and abruptly create a gas bubble at a sufficient depth below the water surface to allow the bubble to expand and contract.

2. Description of the Prior Art

Certain seismic sources such as explosives, airguns, gas exploders, etc., are purposely fired deep under water. It is well known that such firing creates a gas bubble or cavity and that the water acquires oscillatory energy which generates acoustic pressure wavelets, each consisting of a desired "primary" acoustic pressure pulse $P_o$, which is especially useful for most seismic exploration work, and which is followed by an oscillating succession of undesired "secondary" (sometimes called "bubble") acoustic pulses of decreasing amplitude. In this specification, the words "bubble" and "cavity" will be used interchangeably.

For example, an airgun explosively releases a high pressure gas bubble into the water which creates the desired primary pulse having a maximum amplitude $P_o$. After the released high-pressure gas bubble impulsively contacts the surrounding water, it continues to expand as the water first accelerates outwardly and later decelerates until the cavity attains a maximum diameter and comes to rest, at which time the pressure within the cavity is much less than the surrounding hydrostatic pressure.

When the expanding bubble reaches its maximum diameter there is practically a vacuum inside the bubble, the kinetic energy of the surrounding water is zero, and this water possesses maximum oscillatory potential energy which, if not suppressed, will change into kinetic energy, back into potential energy, etc., for a duration of several cycles, each having an oscillatory time period T.

The water gains maximum potential energy at $\frac{1}{2}$ T, at which time the water is ready to change course and rush inwardly to implode the gas in the bubble. After one complete cycle, i.e., at time T, the bubble is recompressed into a relatively small-diameter, high-pressure bubble. The surrounding water comes to an abrupt stop resulting in a first positive acoustic secondary pulse $P_2$ which is mainly dependent upon the maximum kinetic energy acquired by the inwardly-moving water. The less kinetic energy acquired by the water, the smaller $P_2$ will be.

Thus, the secondary pulse problem starts when the surrounding water for the first time violently implodes the bubble to a minimum diameter. When the bubble recompresses and attains a minimum diameter or volume, the kinetic energy is again zero and the potential energy is mainly contained within the recompressed gas inside the bubble. This potential energy causes the bubble to again explode in its oscillatory scheme. In this manner, the oscillatory energy stored in the water produces several successive secondary pulses of deceasing amplitude until a portion of the energy of oscillation becomes dissipated by natural processes, such as turbulence, and the remaining portion is consumed to produce the undesired secondary pulses.

The number of such bubble explosions (expansions) and implosions (contractions) may vary, but typically four to six significant secondary pulses can be expected after each primary pulse $P_o$ which is generated by the seismic source.

Hence, a substantial portion of the acoustic energy released by the seismic source goes to waste. This is so because only a portion of the energy contained in the released gas is used to produce the desired primary seismic pulse $P_o$, while the remaining and substantial portion of the energy becomes converted into harmful secondary seismic pulses which must be suppressed.

Such secondary pulses are now being attenuated by using large arrays of differently sized airguns. All the airguns in the array are fired simultaneously so that the $P_o$ pulses are in phase for addition. Most of the secondary pulses are out of phase and therefore they cancel each other out.

In seismic exploration, both the primary and secondary acoustic pulses act as distinct acoustic disturbances which travel in the water in all directions, penetrate the earth, strike one or more rock formations or reflectors, and then return into the body of water.

The primary and secondary pulses produce reflected seismic wavelets. But, since the secondary and their reflected waves occur at times when the reflected primary waves also return from the subterranean reflectors, it will be apparent that the secondary pulses and their reflected wavelets interfere with the reflected primary waves.

Because the reflected and secondary waves and the reflected primary waves are similar in shape, no practical way has yet been found for distinguishing between them.

The known prior art found neither a practical nor an economical solution for dealing with the "bubble" or secondary pulse problem when using a single explosive-type seismic source. For this reason, and as previously mentioned, marine acoustic sources are used now mostly in arrays to achieve bubble cancellation.

In conducting marine seismic surveys, the reflected primary and secondary seismic waves are sensed by detectors within a towed streamer cable. The detectors faithfully transform the received and acoustic seismic waves into corresponding electric signals which are processed into seismic traces that contain appreciable noise. This noise is due mostly to the oscillatory secondary pulses which accompany each primary pulse.

Under these noisy conditions, computations of the depths at which the rock formations lie become very difficult and sometimes altogether impossible. The noise hinders the main object of the seismic exploration, which is, of course, to identify the various sub-bottom formations from an interpretation of the seismogram sections produced by the seismic survey.

The secondary-to-primary ratio $P_2/P_o$ is the yardstick by which all marine seismic sources are measured as to bubble suppression. An "ideal" source is said to be that source which has a ratio $P_2/P_o=0$ for a frequency range from 0–125 Hz. The extent to which a particular seismic source approaches the ideal seismic source can be readily measured by measuring its $P_2/P_o$ ratio.

An ideal seismic source produces a single, short, sharp acoustic impulse having sufficient energy and no secondary pulses. Sharp impulses are needed to improve the definition of seismic reflections, because resolution is inversely proportional to the time-width of the impulse: the larger the time-width of the impulse, the less desirable it is.

Fired near the water surface, a dynamite charge closely approximates the ideal seismic source, because the bubbles resulting from each explosion are vented immediately into the atmosphere, hence there are no bubble implosions.

If not fired near the water surface, explosive seismic sources will produce undesired secondary pulses, unless some form of implosion suppression is utilized. Explosive seismic sources include explosives, airguns, gasguns, expandable sleeve devices in which propane and oxygen are mixed to cause internal combustion, etc. All of these share the common bubble problem for which there has been no fully satisfactory solution, even though there has been a long-felt need to find a mechanism to enhance the desired primary pulse at the expense of the undesired secondary pulses.

In the absence of such a mechanism, many attempts have been made in the past twenty-five years or more by the oil companies and their seismic contractors to develop techniques for reducing the burden—both financial and technological—imposed by the generation of the undesirable secondary pulses. These efforts were directed toward attenuating the oscillatory secondary pulses and/or to reduce their ill effects.

From the very early introduction of marine seismic sources, there was a continuous need for effective and economical bubble suppression devices. That need and the various solutions offered to fill that need are well described in the technical and patent literature. Only a few of these will be discussed below to illustrate the severity of the bubble problem and the diversity of attempts to solve it.

One early mechanical technique attempts to prevent the secondary pulses from traveling vertically downward towards the water bottom by substantially surrounding the gas bubble source with a container or cage having perforations, so that the expanding gas bubble would have to do work in order to force water through the perforations. The work done by the expanding gas bubble dissipates its internal energy, so that the ensuing secondary pulses will have reduced amplitudes. This technique was used in a seismic source trademarked FLEXOTIR.

A serious limitation inherent in this technique is that the desired primary pulses also become reduced in strength because they can travel freely only through the available perforations. Also, the perforated cage becomes subjected to rapid deterioration, due to the great stresses to which it becomes subjected when large differential pressures become exerted across its wall.

Various software programs have been also developed, for example, in connection with the MAX-IPULSE (trademark) seismic source, which utilize fast and powerful digital computers that produce seismograms from which the detected noisy seismic waves caused by the deleterious bubble effects have been removed so that the seismograms can be easier interpreted by the geophysicists. However, running such programs requires the use of expensive computer time and manpower, see U.S. Pat. No. 3,592,286.

Other techniques are based on air being injected into the expanding bubble for shaping the secondary pulses. The known applications of the air injection technique have led prior art workers to very disappointing results and most of them were abandoned.

In U.S. Pat. No. 3,371,740, the injection of air during the expansion of the cavity might increase the size of the cavity without reducing the amount of kinetic energy stored in the water. The injected atmospheric pressure is too low. The cavity is allowed to implode for too long at a time, and therefore the water is allowed to acquire too much kinetic energy. For a firing depth of 30 ft, it can be shown that $P_2/P_o$ approaches 40%, which is generally unacceptable.

In U.S. Pat. No. 3,454,127, the injection is started too early during the expansion of the bubble. The flow rate of the injection is subsonic, which is insufficient to establish hydrostatic pressure inside the cavity within the required time interval, unless an impractically large gas volume is utilized. Also, the volatilization of a material cannot be used because a material cannot volatilize within the few milliseconds available for achieving hydrostatic pressure inside the cavity.

In U.S. Pat. No. 3,601,216, the final pressure established inside the cavity is not hydrostatic. The volume of gas injected is too small: only 9 ft$^3$ instead of 60 ft$^3$, which is needed. The start of the air injection is not defined, or at most it is defined as "when" the bubble is expanding, which is very imprecise. The time interval allowed for the injection is much too long, "preferably 50 ms," instead of the maximum 20 ms allowed. It uses low injection pressure (150 psi) which leads to severe practical and technical difficulties.

U.S. Pat. No. 3,653,460, involves the use of an airgun having a secondary chamber in addition to a main chamber. Upon the release of the compressed air from the main chamber, the secondary chamber releases its air into the main chamber, and thence out through the discharge ports in the airgun and into the expanding bubble. Air from the secondary chamber is throttled across an orifice which is contained in a dividing wall between the chambers. As a result, the flow rate is maximum when the bubble is small and expanding, and the flow rate is reduced when the bubble reaches its maximum size. This reduction in flow is due to the pressure decrease in the secondary chamber during the bubble expansion. In column 5, lines 1–30 of the last mentioned patent, it is shown that the volume of air injection required to bring the $P_2/P_o$ ration down to 14% is 6.4 times the volume needed to generate the main pulse, which is inefficient, wasteful, and very costly in money and energy consumption. While the quantity of air being injected into the bubble may have some effect on the $P_2/P_o$ ratio, it is generally not enough to keep this ratio within acceptable limits which are already achieved when using tuned airgun arrays, and does not allow the source to become a point source.

Due to the inefficiency or impracticability of known bubble suppression techniques, the seismic industry was obliged to employ a "tuned" array of seismic sources. Typically, these sources are airguns of markedly different sizes.

When all the airguns in a tuned array (using airguns of different sizes) are fired simultaneously, theoretically the amplitude of the resulting primary pulse of the array will be equal to the sum of the amplitudes of the individual primary pulses generated by the individual acoustic sources in the array, whereas the amplitudes of the secondary pulses will be reduced because (1) they are not in phase, (2) they occur at different items, and (3) they have random frequencies.

Nevertheless, the present state of the art in suppressing bubble pulses has been achieved by these "tuned" airgun arrays, which are now widely used.

Even though the array technique is now the standard in this art, it still has serious drawbacks because it is only a composite of individual sources, each source lacking a narrow, sharp acoustic pulse as required. Also, it is very expensive to build such an array because it requires a large number of differently-sizes airguns, as well as heavy and expensive air compressors to provide the volume of 2000 psi air consumed by the large number of airguns. The breakdown of any gun in the array damages the resultant signature of the array, leading to frequency distortion.

There is also a need to maintain on the seismic boat a large inventory of spare parts to keep the differently-sized sources operational. The spare part problem is very serious, because in many parts of the world they are not available and they must be flown in from the home base. Many parts break down daily and some weekly due to salt water, pollution, unsuspected debris, high pressure, etc.

As a consequence, the art has been obliged to use techniques which are known to have serious drawbacks in order to accommodate the demand for marine seismic prospecting. Most importantly, the prior art has failed to suppress the secondary pulses to acceptable levels which would make it possible to utilize a single-point seismic source, or an array of such sources of equal size.

In general, the known bubble suppression devices have the following drawbacks, taken singularly or in combination: they are cumbersome; they require excessive support machinery and space therefor; they require very large compressors and excessive energy to run them; they are expensive to maintain; and they require an excessive inventory of expensive replacement parts to maintain in operational condition the different sizes of seismic sources now utilized to form arrays.

Accordingly, it is a broad object of this invention to remedy the above and other known shortcomings of the prior art, and to provide a practical, economical, and fully effective method for total bubble suppression.

It is another object of this invention to provide a seismic source which is bubble-free and therefore can be used alone for seismic prospecting. If more power is needed, my sources can be used to construct an array which is very beneficial, as will be subsequently described.

It is yet a further object to provide a bubble-free seismic source which is characterized by having a substantially flat power spectrum over a relatively broad frequency range, and which produces a single sharp acoustic impulse followed by negligible secondary pulses.

It is another object of this invention to provide such a novel energy source which has effective bubble suppression means, which is energy-efficient, which lends itself to become easily incorporated into existing marine seismic energy sources and methods of using them without affecting the utility of such known sources and methods, which is simple in design, compact in use, and relatively inexpensive to manufacture and maintain, and in which the volume of air required for aborting the implosion is reduced to a small fraction of what was generally believed to be necessary to achieve adequate bubble suppression.

SUMMARY OF THE INVENTION

The novel method of the present invention substantially reduces the pressure pulse generated by a first radial motion of a body of water, by changing the radial motion into axial motion. The change from radial motion into axial motion is produced by generating a second radial motion of opposite phase within the body of water.

The method can be used to substantially reduce the pressure pulse generated by the implosion of a body of water by generating an explosion within the body of water about the time the implosion starts. It can also substantially reduce the pressure pulse generated by an explosion within a body of water by generating an implosion of the body of water about the time the explosion starts. The method can further be used to generate within a body of water an impulsive acoustic signal by sequentially generating within the body of water a first explosion and a second explosion. The second explosion must be generated at a time when the body of water starts to implode the cavity ensuing from the first explosion, or when the cavity is at its maximum volume.

The novel marine acoustic source for generating impulsive acoustic signals in a body of water comprises a signal chamber which contains a first charge of a highly compressed gas. A normally-closed first fast-acting valve means normally maintains the signal chamber closed and has a discharge port into the water. A second chamber contains a second charge of a highly compressed gas. A normally-closed second fast-acting valve normally maintains the second chamber closed and has an outlet into the water. A controller explosively opens the first valve so as to release the first charge into the water and thereby generate an impulsive acoustic signal and a first bubble. The controller subsequently opens the second valve to thereby release the second charge from the second chamber through the outlet and into the water, while the first bubble is near its maximum volume.

BRIEF DESCRIPTION OF THE DRAWINGS

FIG. 1 illustrates an oscillating bubble in a body of water;

FIG. 2 is a pressure vs. time signature corresponding to FIG. 1:

FIG. 3 illustrates the behavior of bubble 1 when acted upon by bubble 2 in accordance with the invention;

FIG. 4 is a pressure vs. time signature corresponding to FIG. 3:

FIGS. 5-10 are sectional views of an illustrative embodiment of this invention, showing six operating phases thereof;

FIG. 5A is a sectional view on line 5A—5A in FIG. 5;

FIGS. 11-18 are a series of graphs comparing actual pressure vs. time and power vs. frequency plots obtained without the invention and with the invention;

FIGS. 11 and 12 are pressure vs. time and power spectrum vs. frequency plots, respectively, of signal generator 10' operating alone;

FIGS. 13 and 14 are pressure vs. time and power spectrum vs. frequency plots, respectively, of signal generator 10' operating together with generator 10";

FIG. 15 illustrates consecutive explosions spaced 10 seconds apart and generated with generator 10' only;

FIG. 16 shows consecutive pressure signatures obtained from the consecutive explosions shown in FIG. 15;

FIG. 17 illustrates consecutive double explosions also spaced 10 seconds apart but generated with generators 10' and 10" following the method of this invention; and FIG. 18 shows consecutive pressure signatures obtained from the consecutive double explosions shown in FIG. 17.

DESCRIPTION OF PREFERRED EMBODIMENTS

Figure 7:
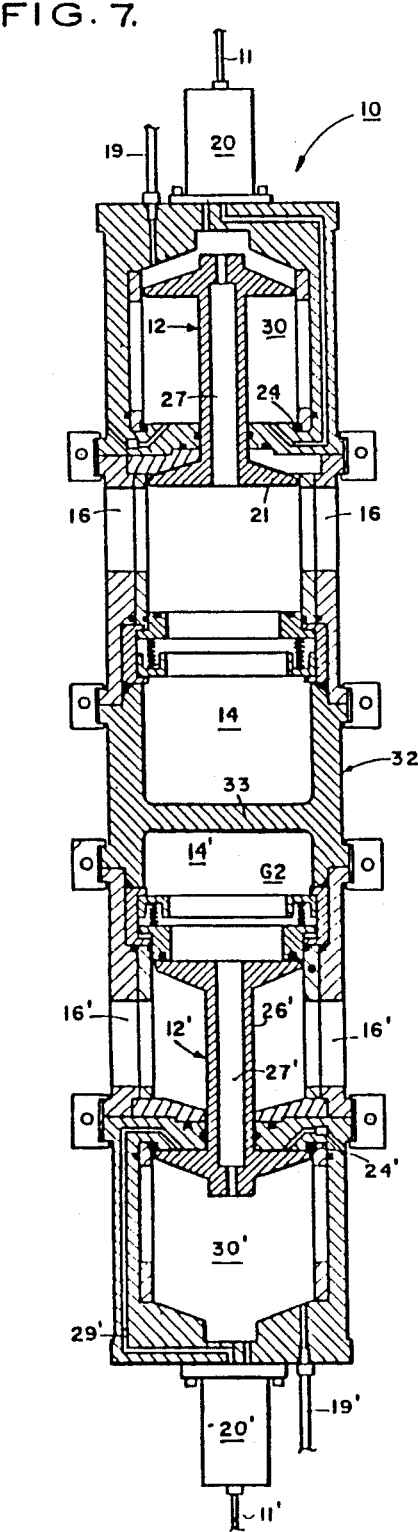
Figure 8:
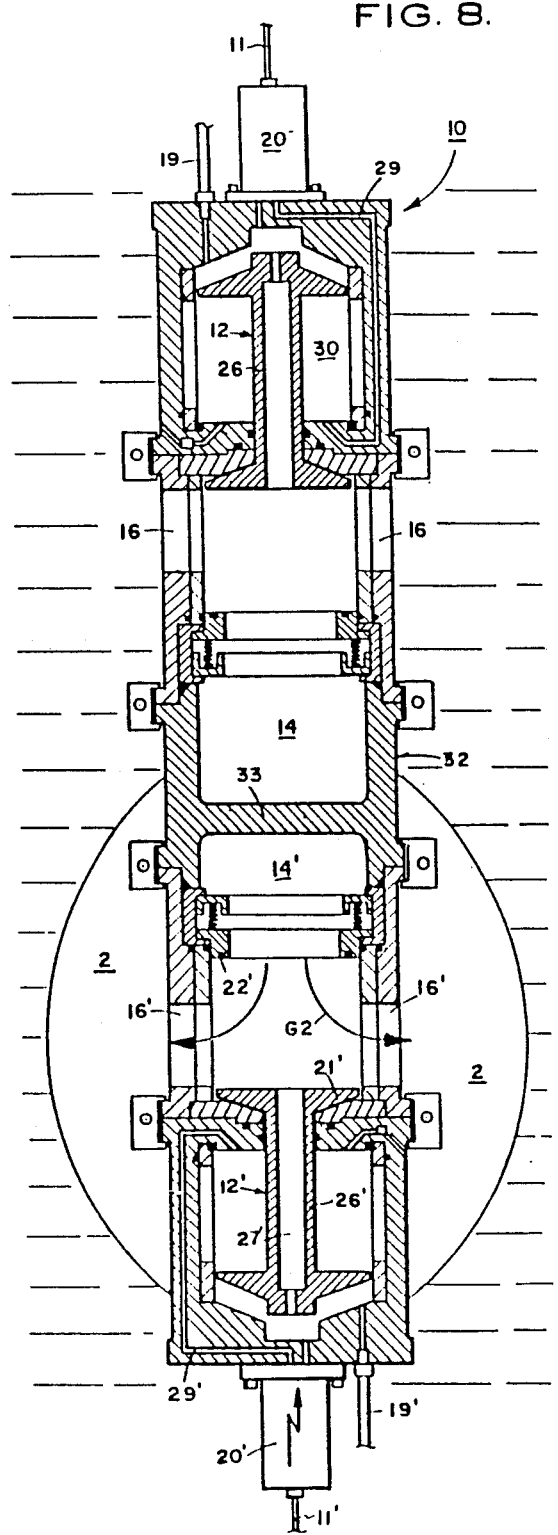
Figure 9:
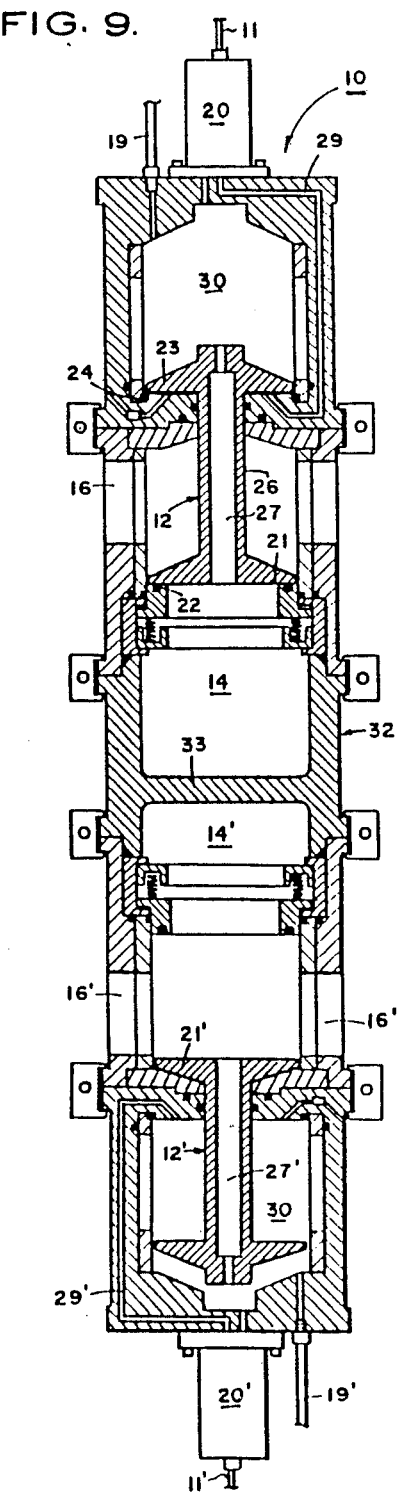
Figure 10:
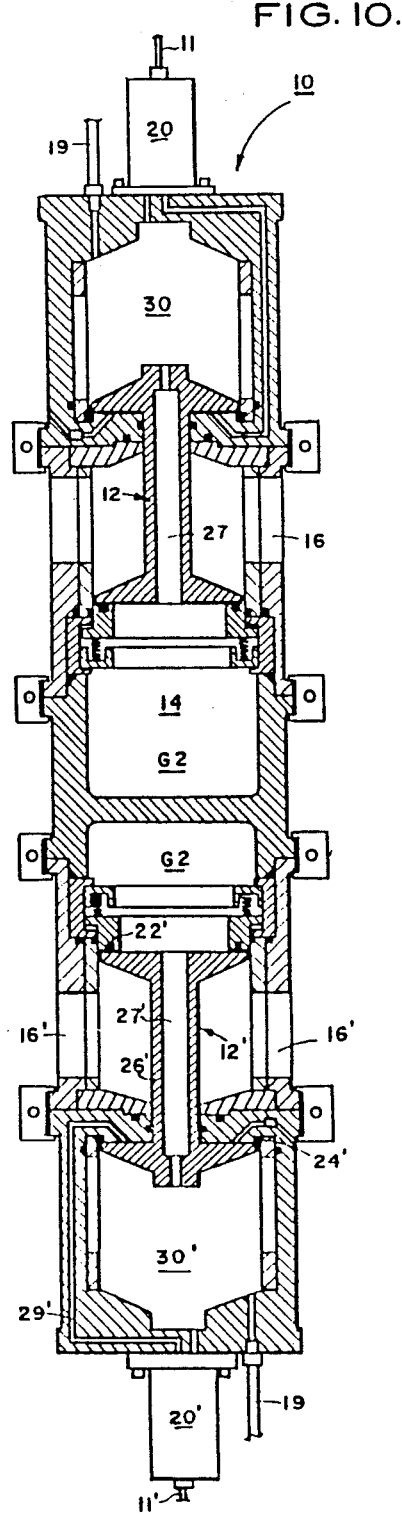
Figure 15:
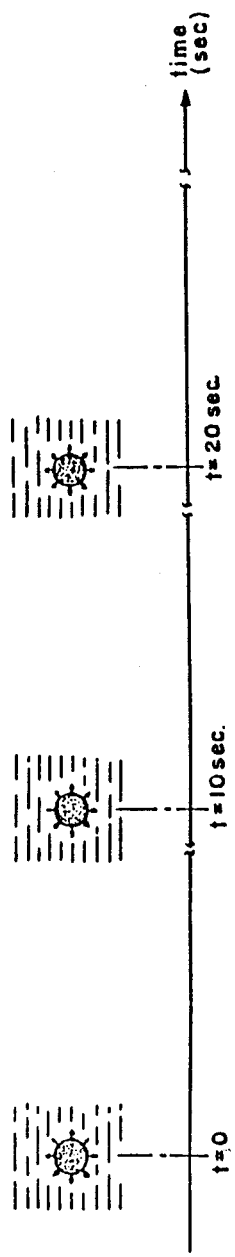

Conventional methods for operating explosive marine seismic acoustic generators involve generating a first explosion which releases at a depth D in a body of water, at a time $t_o$ (FIGS. 1, 15), a first bubble 1 having a gas G1, a pressure Pa, and a volume Va. The pressure inside bubble 1 varies relative to the hydrostatic pressure, as bubble 1 undergoes cyclic implosions (contractions) and explosions (expansions) at an oscillatory period T.

The pressure signature (FIGS. 2, 16) exhibits a desired pressure impulse $P_o$ as well as undesired positive (P1, P4,....) secondary pressure impulses of decreasing amplitude.

It has been suggested that prior to the time bubble 1 reaches its maximum diameter at T/2, if the pressure inside bubble 1 were raised by an injection of gas, then the amplitudes of the secondary pressure pulses resulting from the subsequent implosions and explosions of bubble 1 would be substantially reduced, as compared to the amplitudes of the secondary pulses which would be produced without such gas injection. I found this assumption to be wholly incomplete and inaccurate.

I have unexpectedly discovered why prior art workers in this art have failed to fill the long-existing need for a single explosive marine seismic acoustic generator, which is substantially bubble free, i.e., which is characterized by a relatively low secondary-to-primary $P_2/P_o$ ratio.

I have also unexpectedly discovered theoretically and experimentally that the secondary pressure pulse generated by the implosion increases very rapidly at the early stage of the collapse of the cavity.

In my copending application Ser. No. 703,302, I have described a bubble injection process which required an injection of a volume Vb of gas G2 into bubble 1. In one embodiment, the optimum ratio for Vb/Va was 2.15 and $P_2/P_o$ was near zero. This ratio Vb/Va=2.15 is already more than 100% improvement over the known prior art.

I have now discovered that it is possible to substantially reduce the secondary pulses following the implosion of the body of water by generating a second gas bubble 2 outside and in the vicinity of the first bubble 1 at about the time bubble 1 reaches its maximum size.

I have also discovered that the opposite is also true: the primary pressure pulse generated by an explosion, or by the explosive release of a high-pressure gas within the water, can be reduced or suppressed by generating an implosion outside and in the vicinity of the explosion about the time the explosion starts.

Thus, it is now possible, according to my invention, to suppress the pressure pulse produced by an implosion by generating an explosion, or conversely to suppress the pressure pulse produced by an explosion by generating an implosion. I have unexpectedly discovered that the reciprocity or "flip-flop" between explosion and implosion ensue from the fact that both the implosion and explosion produce the same type of motion in the water. This motion is radial motion which is nearly the same in all directions, with difference however that an implosion generates an inward radial motion, and an explosion generates an outward radial motion. Hence these two radial motions are out of phase or reversed phase.

By contrast, a motion which has an axis of symmetry is generally called an "axisymmetric" motion. For simplicity, such a motion will be called in this specification and claims an "axial" motion.

What I have discovered is that the radial character of the motion of the water is of prime importance for the generation of a pressure pulse. For the same amount of kinetic energy stored in water motion, the more radial the motion is, the more powerful the pressure pulse will be.

If an implosion or an explosion is generated at a sufficient depth for the body of water to be considered as isotropic in the vicinity of the implosion or explosion, the motion generated by the implosion or explosion will be substantially radial. The cavity will be substantially spherical and will undergo several oscillations producing several powerful pressure pulses.

On the other hand, if the implosion or explosion is generated at a shallow depth, or immediately below the water surface, where neither the mass repartition nor the hydrostatic pressure are the same in all directions (nonisotropic), the motion generated by such "shallow" implosions or explosions will be "non-radial," but rather "axial" in the vertical direction (the axis of symmetry).

It is a well-known fact that an implosion generated just below the water surface will not produce any pressure pulse. The flow of water rushing inward will be deflected upward, and its kinetic energy dissipated in the process without producing any significant pressure pulse. It is also well-known that an explosion generated at a shallow depth will produce a reduced primary pulse and no secondary pulse, The energy being dissipated in the vertical (axial) motion of the water (confer Seismic Energy Sources Handbook, 1968).

The inability of an axial motion to generate a powerful pressure pulse within a body of water, as well as the ability of a radial motion to produce such a powerful pulse, is even more completely demonstrated when using a watergun process, such as is described in my prior U.S. Pat. Nos. 4,303,141 and 4,185,714.

Initially, when using the watergun, a water slug is axially propelled downwardly and an axial motion is thereby generated within the body of water. In this phase, only a weak, non-significant pressure pulse is generated. In a later stage, the kinetic energy of the axial motion is transformed into kinetic energy of radial motion (the implosion of the cavity), and it is this radial motion which generates the desired powerful pressure pulse.

In sum, the same quantity of kinetic energy will not produce any significant pressure pulse when stored in an axial motion, but it will produce a powerful pressure pulse when stored in a radial motion. It is also known that when two cavities within a body of water undergo oscillations in the same phase, they have the tendency to attract each other and coalesce. But the force of attraction is relatively small.

What I have discovered is that when two cavities undergo oscillations in reversed (opposite) phase within a body of water, they are pushed away from one another by a strong impulsive force. At each cycle, the radial motion of each cavity is deflected by the opposite motion of the other cavity into an axial motion, and therefore the pressure pulses generated, if any, are strongly reduced. Finally, the kinetic energies of the two motions are dissipated during the drifting of the cavities away from one another.

I have found that the amount of kinetic energy stored in the water located between the two centers of motion is of prime importance for the pulse-suppression process. As the separation distance between two centers of radial motion increases, the mass of the body of water between the two centers increases rapidly and the body's velocity decreases rapidly. Hence, for a given strength of the radial motion, there is an optimum separation distance between the two centers.

Both bubble 1 and bubble 2 independently generate a radial motion, or more precisely, a radial velocity field. At each point in the water body, the velocity of the water, u is radial and is given by the following relationship $$u = \frac{R^2 \dot{R}}{r^2}$$

where R is the radius of the bubble at a time t; $\dot{R} = dR/dt$ is the derivative of this radius R versus time; and r is the distance of a given point to the center of the bubble. Hydrodynamically, this type of flow is referred to as a "potential flow".

It is well established in the art that the most important property of this "potential flow" is additivity. At each given point, the velocity of the water due to bubble 1 and bubble 2 together is the vector sum of the velocity due to bubble 1 and the velocity due to bubble 2, where the velocity of both bubble 1 and bubble 2 is taken individually.

Referring to the operation of the presently claimed device, an explosion generates a first bubble 1 which expands until it attains its maximum radius $R_m$. At this time, the velocity of bubble 1 is zero. About this instant, a second explosion generates a bubble 2. As bubble 2 initially expands, its velocity is very high. As the magnitude of this velocity decreases at a rate determined by the ratio $1/r^2$, bubble 1 is acted on by bubble 2 and undergoes distortion. The velocities at the boundary of bubble 1 will have a resultant along and outward from the axis of symmetry of bubble 1 and 2, resulting in a "bean shaped" distortion of bubble 1 (in axial form).

I have found that the distance between the two centers of radial motion should preferably be comprised approximately between one and two times the maximum displacement of the first radial motion, and the energy of the second radial motion should be approximately between half and twice the energy of the first radial motion.

The two explosions are of such character that their effects on the body of water mutually interact to an extent that the second bubble substantially aborts the implosion of the first bubble, and the first bubble substantially reduces the primary pulse and aborts the implosion of the second bubble.

A step-by-step schematical illustration of the operation of the present invention may be seen by reference to FIGS. 25A–F.

In FIG. 25, bubble 1 is shown at T/2 or when bubble 1 has achieved its maximum radius $R_m$. At T/2, the internal pressure of bubble 1, $P_1$, is almost zero.

Figure 25A:
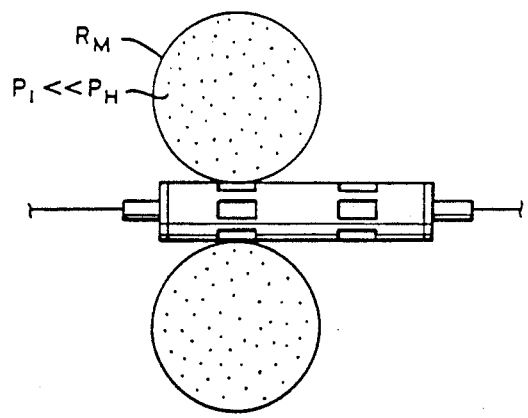
FIGS. 25A–F illustrate the noncoalescing behavior of a bubble generated by the generator of the invention when acted on by a bubble from a second chamber.
Figure 25D:
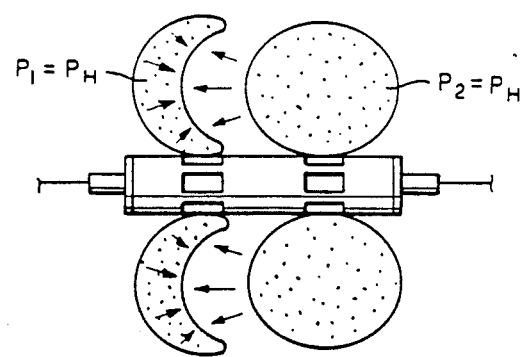
Figure 25B:
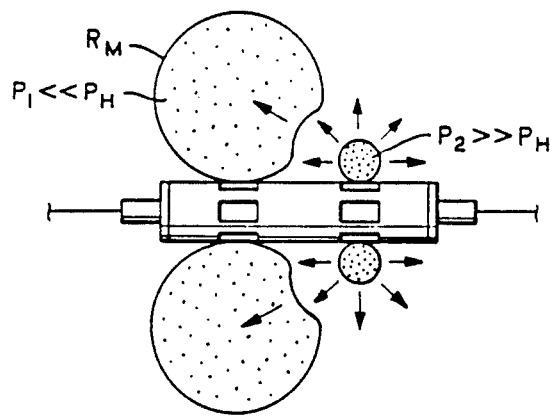

As seen in FIG. 25B, a brief instant after T/2 a second explosion generated by the second chamber produces bubble 2 at a set distance L from bubble 1. At this brief instant, bubble 1 still maintains its maximum radius $R_m$, and the pressure of bubble 1 is much less than hydrostatic pressure $P_H$. At this time also, the pressure of bubble 2, $P_2$, is much greater than hydrostatic pressure, hence bubble 2 expands rapidly pushing a layer of water toward bubble 1. The effect of this water layer results in a distortion of the outer shape of bubble 1 and in an axial motion of this bubble 1.

Figure 25E:
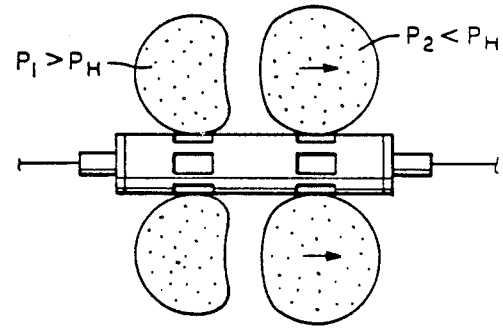
Figure 25C:
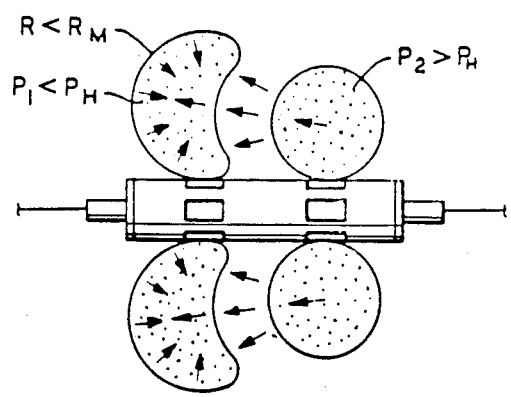
Figure 25F:
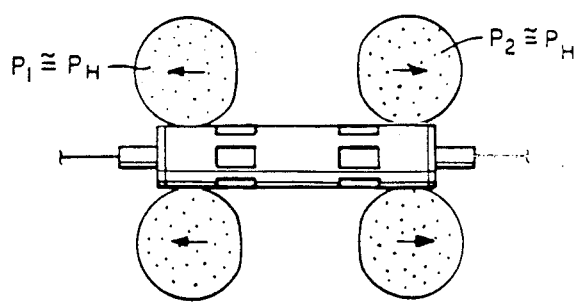

As seen in FIG. 25C, as bubble 2 increases in size its internal pressure diminishes somewhat with regard to hydrostatic pressure, hence $P_2 > P_H$. Conversely, bubble 1 is now collapsing, and the compression of gas inside bubble 1 now begins to stabilize with regard to hydrostatic pressure, hence $P_1 < P_H$. As bubble 2 continues its rapid expansion, a further distortion of the configuration of bubble 1 occurs as water trapped between the expanding bubble 2 and the contracting bubble 1 further modifies the outer configuration of bubble 1 as illustrated.

Sequentially and as illustrated in FIG. 25D, bubble 2 has expanded further and the internal pressure of bubble 2, $P_2$, equals $P_H$. At this time also, the internal pressure of bubble 1, $P_1$, equals $P_H$, since the compressions of gases trapped inside the collapsing and moving bubble 1 have equalized this internal pressure $P_1$ relative to the hydrostatic pressure. Bubble 1 has undergone still further distortion as shown.

At a short instant later as seen in FIG. 25E, bubble 2 has reached its maximum size and $P_2 < P_H$. Bubble 1, however, has now contracted to such an extent that its internal pressure is again greater than hydrostatic pressure, hence $P_1 > P_H$. But $P_2$ and $P_1$ remain close to $P_H$, and hence no secondary pulse is emitted.

Figure 17:
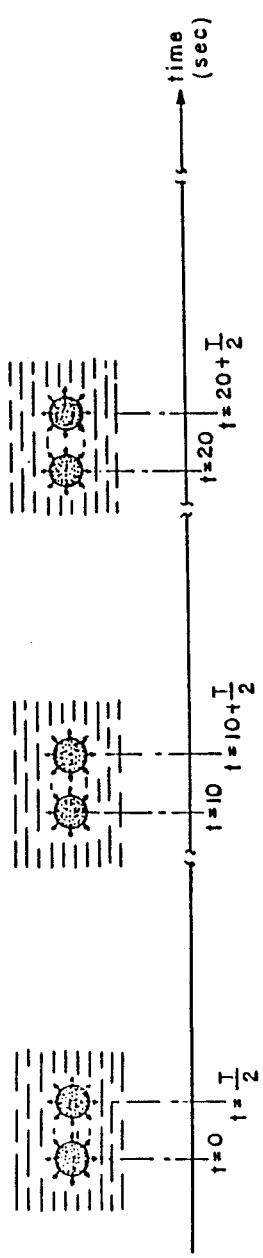

The second explosion must occur about the time that bubble 1 reaches its maximum size (FIG. 3), its energy should be commensurate with the energy of the first explosion, and the second explosion should be sufficiently close to bubble 1 to maximally interact with it, yet of sufficient distance from bubble 1 so as to not coalesce with it. Thus, two consecutive explosions are generated (FIG. 17) within milliseconds from each other to thereby obtain a single powerful pressure pulse (FIG. 18) which is essentially bubble-free.

With general reference to FIGS. 5–10, the present acoustic source 10 has a first explosive acoustic generator 10' and a second explosive acoustic generator 10" that have common elements which will be designated with the same reference characters to simplify the description, and similar elements will be designated with a prime (') whenever possible.

Each acoustic generator 10' and or 10" can be a commercially available airgun, such as the one manufactured under the trademark PAR, which is fully described in U.S. Pat. No. 3,379,373. Other such generators can be employed equally well for the purposes of this invention.

Such an airgun has a first chamber 14 whose volume Va is charged up with air G1 under pressure Pa. Chamber 14 communicates directly with an explosive shuttle valve 12. Valve 12 includes a main piston 21 with a seal 22 for retaining the charge of pressurized gas G1 within first chamber 14, and a control piston 23 with a seal 24 for controlling the movements of piston 21. Pistons 21 and 23 are held together, in spaced parallel relation, by a hollow shaft 26 having an axial bore 27 therethrough.

A compressor on the deck of the seismic vessel (not shown) supplies air pressure to input line 19 at 2000 psig, which is fed to a return chamber 30 from which it passes through the axial bore 27 into first chamber 14.

The actuation of valve 12 is controlled by a controller such as solenoid-operated valve 20, which is energized periodically by a short electric pulse on line 11 produced by a conventional, electronic actuating network (not shown) also located on the deck of the seismic vessel. The firing of the first explosive generator 10' is periodically repeated as dictated by the firing cycle of the seismic survey.

When solenoid valve 20 is fired (FIG. 6), pressurized gas flows from line 19 through a trigger passage 29 leading to the opposite surface of control piston 23 from that facing control chamber 30. The trigger pressure is sufficient to instantly overcome the holding force of the air pressure in control chamber 30, allowing the pressurized gas G1 in the first chamber 14 to suddenly accelerate main piston 21 away from its seal 22, thereby suddenly opening the discharge ports 16 to first chamber 14.

Figure 16:
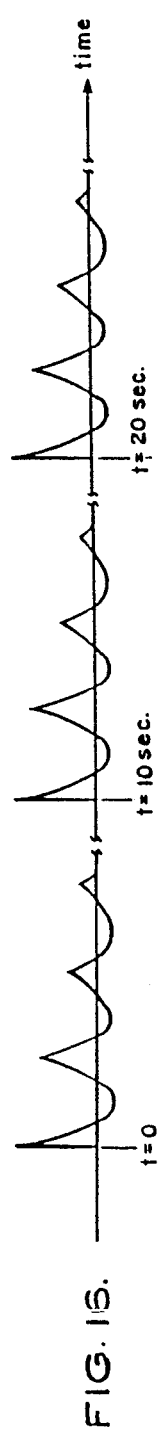
Figure 18:
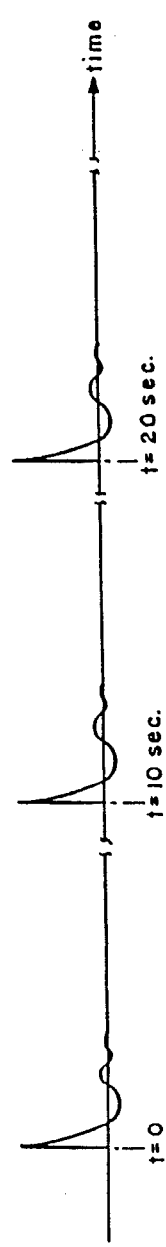

Then, the pressurized gas G1 from first chamber 14 is explosively released through discharge ports 16 into the surrounding water, wherein it produces at time $T_o$ bubble 1 (FIG. 3) and a desired primary impulse $P_o$ (FIGS. 4, 18). In the absence of my second explosion, bubble 1 would undergo a series of implosions and explosions (FIG. 1) at an oscillating period T, which would result in the undesirable secondary peaks P2, P4 . . . of decreasing amplitude (FIGS. 2, 16).

After the discharge of the gas G1 from first chamber 14, the pressure in control chamber 30 returns shuttle valve 12 to its closed position (FIG. 9), and first generator 10' is ready for a new cycle.

To abort the first implosion, a second explosive generator 10" is utilized which generates an explosion outside of bubble 1.

The second generator 10" has a second chamber 14' which contains a volume Vb of gas G2. For the sake of economy in this example, Pb=Pa.

Generator 10" also has an explosive shuttle valve 12'.

The first generator 10' and the second generator 10" are fixedly coupled to each other back-to-back in an axially aligned relation. For that purpose a single container 32 is utilized having a partition wall 33 which defines the first chamber 14 and the second chamber 14". Except for container 32, the first generator 10' and the second generator 10" are of the type previously briefly described above and more fully described in U.S. Pat. No. 3,379,373.

The solenoid valves 20, 20' are thus axially opposed. Solenoids 20 and 20' are energized from the electronic network which is on board the seismic vessel.

Second generator 10" (FIG. 8) generates bubble 2 after a time delay Td. When first generator 10' is ready to be fired (FIG. 5), first chamber 14 has 2000 psi, and valve 12 is being kept closed by the 2000 psi pressure in chamber 30.

An electric pulse is sent to solenoid 20 on line 11 (FIG. 6) which causes the gas G1 from first chamber 14 to explosively discharge outside through discharge ports 16 into the water to create bubble 1. After a time delay Td of 50 ms, a second electric pulse is sent to solenoid 20' on line 11' (FIG. 8) which causes shuttle valve 12' to explosively release gas G2 from chamber 14' into the water through discharge ports 16' and thereby generate bubble 2.

Valve 12 opens at a time t=0 and closes at t=60 ms, and valve 12' opens at 50 ms and closes at 110 ms. Both valves 12 and 12' are open together for about 10 ms. The first chamber 14 and second chamber 14' receive a new charge of compressed air immediately after being discharged.

If source 10 is operated at a low hydrostatic pressure, then bubble 1 will have a very large volume. On the other hand, if source 10 is submerged at greater depths, the volume of bubble 1 will be much smaller. In the shallow depths, the volume of bubble 1 can be so large that it will encompass the discharge ports 16' of explosive generator 10". On the other hand, in deeper waters, bubble 1 will not encompass ports 16' of explosive generator 10".

It is important to fire source 10 at a sufficient depth so that bubble 1, when it fully expands to its maximum diameter, will not encompass ports 16' of second generator 10" and will not coalesce with bubble 2.

After 50 ms, when bubble 1 is fully expanded and has already reached its maximum size, second generator 10" is fired and its bubble 2 starts to increase in size. Because bubble 2 follows the path of minimum resistance, bubble 2 will push the water outwardly and especially the water which is between the two bubbles. Bubble 2 will increase in size and will decrease the size of bubble 1 while the radial inward motion of the water into bubble 1 will be changed into an axial motion having a direction parallel to the axis of source 10.

Bubble 2 continues to expand and at the same time bubble 1 collapses further. The volume of bubble 1 is decreasing and its inner pressure is increasing, while bubble 2 is increasing in size and its inner pressure is decreasing until the two bubbles 1 and 2 attain the same inner pressure.

The pressures in bubbles 1 and 2 optimally reach hydrostatic pressure at the same time and both bubbles will continue to oscillate gently and will emit a wavelet having negligible secondary pulses. This intimate interacting by bubble 1 with bubble 2 causes the water to dissipate its potential oscillatory energy in pushing away bubble 2 from bubble 1. In this manner, the oscillatory energy stored in the water becomes dissipated in the process of pushing each of the bubbles instead of emitting relatively large amplitude pulses.

Detailed Description Of One Operating Cycle

The pressure in a particular space "S" will be designated by "Ps" to simplify the description. Thus, for example, P14 means the pressure in the space defined by chamber 14. In this example the volume of the first and second chamber is varied while their respective pressures is kept constant. Additionally, the distance between the ports servicing each respective chamber is also kept constant.

PHASE 1. First Generator 10' Is Ready To Fire.
   Generator 10' (FIGS. 5) and generator 10'' are armed.
   Solenoid valves 20 and 20' are closed.
   Shuttle valves 12 and 12' seal respectively first chamber 14 and second chamber 14'.
   Source 10 is pressurized:
   $P30 = P14 = P14' = P30' = 2000$ psi.
   $P29 - Ph$ (hydrostatic pressure) = 17 psi.
   Volumes:
   First chamber $V_a = V14 = 45$ in$^3$
   Second chamber $V_b = V14' = 30$ in$^3$ PHASE 2. First Generator 10' Exploded—Peak $P_o$ Emitted
   At $t=0$ (FIGS. 2, 4, 6)
   Firing of first generator 10' is initiated by energizing solenoid valve 20 with a short electric pulse on line 11.
   Shuttle valve 12 moves up and allows the compressed air G1 (2000 psi) from first chamber 14 to discharge explosively through ports 16 into the surrounding water and to form therein bubble 1.
   The explosive release of bubble 1 from chamber 14 generates the desired primary acoustic impulse $P_o$, as shown on the pressure signature (FIG. 2).
   Bubble 1 continues to expand (FIGS. 1, 3).

PHASE 3. Bubble 1 Is Close To Its Maximum Size
   At $t=45$ ms (FIG. 7)
   Bubble 1 is near its maximum size.
   Pressure inside bubble 1 is much less than the hydrostatic pressure; actually bubble 1, at this instant, can be considered as being a vacuum cavity.
   A negative impulse P1 is on the pressure signature.
   Second generator 10'' is still in its stand-by mode.

PHASE 4. Generator 10'' Generates Bubble 2 Outside Bubble 1
   At $t=50$ ms. (FIG. 8)
   Bubble 1 has reached maximum size.
   At 50 ms after $T_o$ (the time delay $T_d = 50$ ms depends on the size of bubble 1, depth of firing, and/or firing pressure Pa) solenoid 20' of second generator 10'' is energized.
   Shuttle valve 12' opens to allow the compressed air G2 from second chamber 14' to discharge abruptly through outlet ports 16' into the surrounding water and to form therein bubble 2 (FIG. 4).
   The pressure impulse shows an upward step (FIG. 4).

PHASE 5. Bubble 2 Establishes Hydrostatic Pressure Inside Bubble 1
   At $t=55$ ms (FIG. 9)
   The amplitude of the acoustic impulse is near zero.
   Shuttle valve 12 has moved to again seal off its chamber 14.

PHASE 6. Bubbles 1 And 2 Are At Hydrostatic Pressure And Oscillate Gently Around Their Equilibrium Position
   The implosion of bubble 1 has been aborted and no substantial pressure pulse was emitted by bubble 2.
   Bubbles 1 and 2 attain hydrostatic pressure. They are stabilized and separated from each other. They undergo low-amplitude oscillations which generate a very low-amplitude, low-frequency acoustic wavelet.
   Shuttle valve 12' has moved to again seal off its chamber 14'.
   First generator 10' and second generator 10'' are again pressurized up to 2000 psi and made ready for another cycle.

As noted, the above description was directed toward a situation where the pressures in the respective generators were equal, e.g. $P14 = P14' = 2000$ psi, and the distance L between the respective ports was kept static. However, any one of these variables can be changed or "tuned" to accomplish a satisfactory $P_2/P_o$ ratio in a particular gun arrangement.

Figure 20:
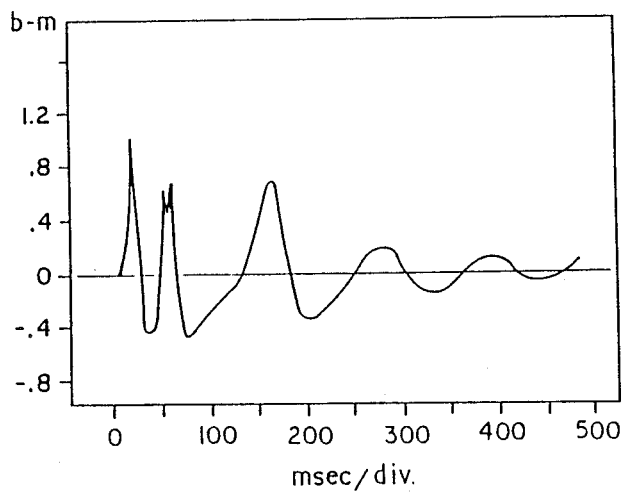

For example and by reference to FIG. 20, an apparatus having the following pressure and volume relationship Volume $V_a = 45$ in$^3$ $V_b = 150$ in$^3$ Pressure $P_a = 2000$ psi, $P_b = 2000$ psi; $P_H = 17$ psi, where the distance L between the ports is set at 0.43 M meters, will yield upon explosion and interaction a $P_2/P_o$ ratio of 65%.

Figure 21:
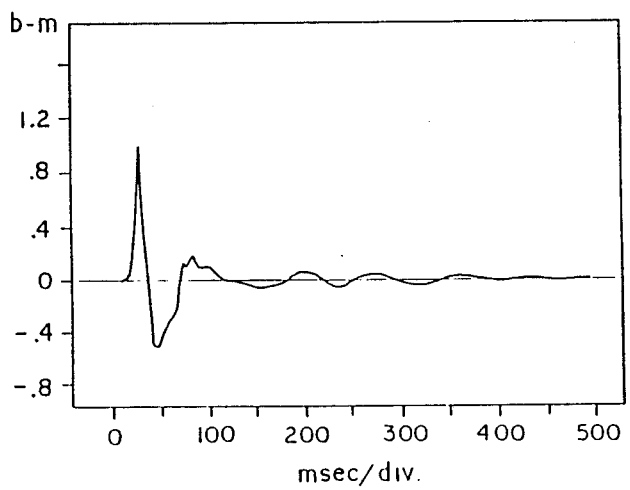

As noted, this ratio is generally unacceptable in the seismic industry. However, by "tuning" the gun, i.e., modifying the pressure in either the first or second chamber, a desired $P_2/P_o$ ratio may be established. As seen in FIG. 21, an acceptable $P_2/P_o$ signature of approximately 10% may be achieved when the pressure in the second chamber $P_b$ is reduced to 360 psi, when the values $V_a$, $V_b$ and L are kept static. In both configurations the delay Td has been adjusted ("supertuned") to get the best result possible for each configuration.

Figure 22:
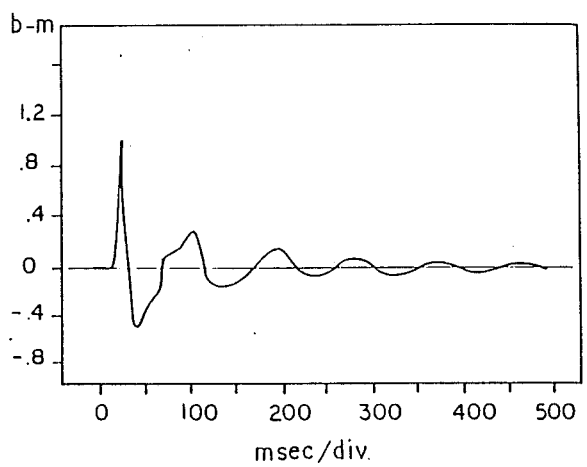
Figure 24:
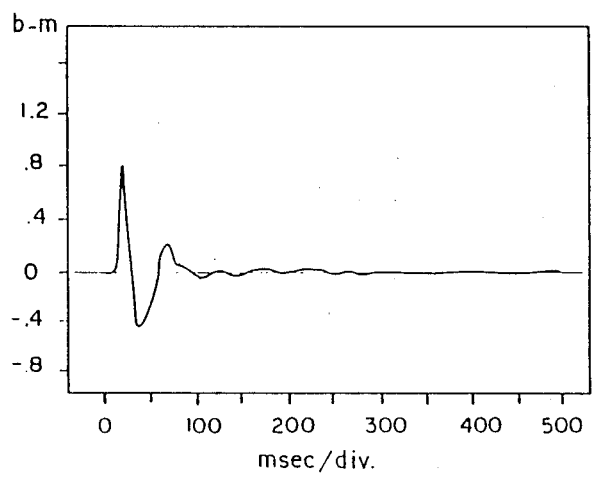

Likewise, the performance of the apparatus may be effected by altering the pressure in the generator $P_a$. Referring to FIG. 22, a generator having chamber values $V_a = 45$ in$^3$, $V_b = 30$ in$^3$,
$P_a = 2000$ psi, $P_b = 2000$ psi, where $L = 0.36$ m. is operated with a resultant $P_2/P_o$ ratio of about 25%. While this signature is acceptable in some applications, this performance can be further enhanced by a modification of the pressure in the generator. Hence, and as seen in FIG. 24, when said pressure is decreased from $P_a = 2000$ psi to $P_a = 1400$ psi, the operation of the gun yields a better than acceptable $P_2/P_o$ value of 5%. Again this improvement was achieved by modification of but one variable.

Figure 23:
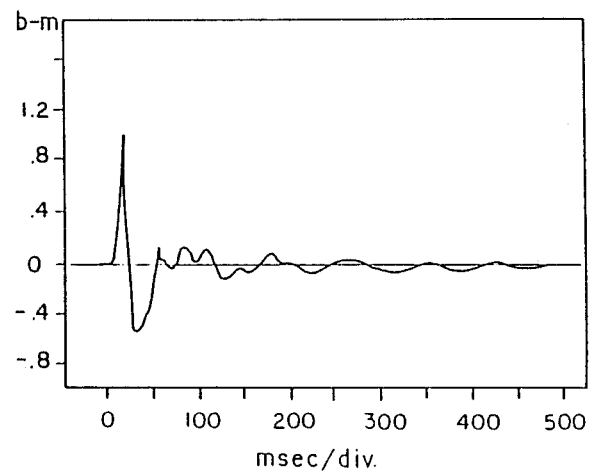

Also in comparing FIG. 22 to FIG. 23, it can be seen that an acceptable level of bubble suppression can be achieved by changing the distance between ports from $L = 0.36$ m to $L = 0.60$ m. (The slight variation in volume has not been consequential in this particular configuration.)

General Aspects of Operation

I have discovered the following:

1. Distance Between Ports as Established as a Function of the Maximum Radius of the First Bubble The center of the second bubble should be proximate to (in the vicinity of) the first bubble. Preferably the distance L between ports should be between one and two times the maximum radius $R_m$ of the first bubble.

$$1 < L/R_m < 2$$

The lower limit is established as a consequence of the requirement that the two bubbles must not coalesce. The upper limit is resultant from the requirement that the two bubbles must maximally interact, hence be necessarily proximate. While an upper limit of 2 is cited, the ratio of $L/R_m$ may actually exceed this limit with a commensurate increase in the $P_2/P_o$ ratio.

2. Energy of the Second Bubble as a Function of the Energy of the First Bubble

The energy of the first and second bubble is established by the product of the pressure and volume maintained in the first and second chambers respectively, e.g., Ea=PaVa and Eb=PbVb. For the invention to operate in accordance with the preferred embodiment, it has been found that the ratio of the energy of the second chamber, Eb, to the energy in the first chamber, Ea, should preferably maintain a range:

$$0.5 < {}^{Eb}/Ea < 2$$

The lower limit of this relationship is due to the fact that the energy of the second bubble should be comparable to the energy of the first bubble in order to achieve the directed reduction of the secondary pulse.

The upper limit joins the lower limit for the energy of bubble 2 in the copending application earlier referenced.

By reference to FIG. 23, acceptable results have been achieved when the ratio $${}^{Eb}/Ea = 26 \times 2000/45 \times 2000 = 0.57$$

and when $${}^{Eb}/Ea = 95 \times 2000/45 \times 2000 = 2.11.$$

It is also well known that the maximum radius of a bubble is directly proportioned to the cubic root of its energy. In this connection, the above relationship between the respective energies of the first and second bubble may be also written $$0.79 < R'm/R_m < 1.26$$

where $R_m$ is the maximum radius of bubble 1 and R'm is the maximum radius of bubble 2, when bubble 2 is released in the body of water independently of bubble 1. Roughly related: $R'm/R_m = 1 \pm 25\%$ 3. Relationship Between Energy and Distance It has been discovered that the energy of the second bubble Eb must decrease when the distance L between the ports increases. This relationship may be seen by reference to FIGS. 19 and 23.

Figure 19:
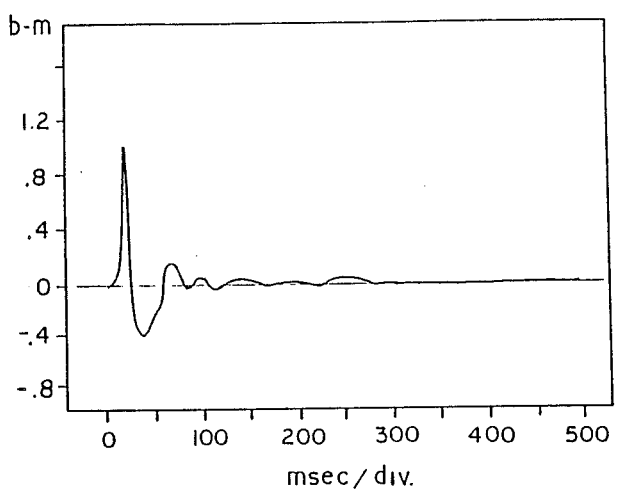
FIGS. 19–24 are a series of graphs comparing actual pressure vs. time graphs when the invention is tuned to establish a desired pressure signature.

In FIG. 19 the energy ratio is $EB/Ea = 1.47$ for a distance L between the ports of 36 cm, or a ratio $L/R_m = 1.05$.

In FIG. 23 the energy ratio has a value $Eb/Ea = 0.57$ where the distance between the ports L=60 cm and the ratio $L/R_m = 1.74$.

Therefore, and as earlier described, the "tuning" of bubble 1 and bubble 2 can be achieved by modifying either one or both of the ratios $L/R_m$ and $Eb/Ea$.

It has been further discovered as a consequence of theory and experimentation, that the product $\pi$ expressed $$\pi = (L/Rm) \times (Eb/Ea)^{\frac{1}{2}}$$

should remain approximately constant within the useful ranges. In this connection, it has been experimentally determined that preferred results are achieved when this product $\pi$ approximately equals $1.30 \pm 10\%$.

4. Timing

The time delay Td between the initiation of bubble 1 and bubble 2 should be approximately equal to half the period, T/2, of bubble 1. Further optimization however, may be achieved when the energy and distance L are properly "tuned" as aforedescribed. Still further reduction of the $P_2/P_o$ ratio however may be achieved by "supertuning" this delay, Td, around its nominal value T/2. This is usually accomplished within 25% of the nominal value. For example and as seen in FIG. 21, the minimum value of the ratio $P_2/P_o$ has been achieved with a delay Td=50 msec representing a 25% increase over the half period T/2=40 msec.

5. Tuning

As previously described, an acceptable bubble suppression can be achieved by "tuning" bubble 1 and bubble 2. Several parameters are at the disposal of the operator to achieve a desired $P_2/P_o$ signature. As illustrated, most of these parameters of pressure, distance between the ports, and timing are relatively easy to adjust in the field.

For instance, the ratio Eb/Ea can be adjusted (without modifying any other parameter), by changing the pressure $P_b$ of the gas in the suppressor. The comparative ease with which favorable results may be achieved as a result of this "tuning" process is seen in FIGS. 20 and 21. Referring to the examples illustrated in these figures, the ratio $Eb/_{Ea}$ originally equal to $150 \times 2000/45 \times 2000 = 3.3$ as seen in FIG. 20 has been modified (reduced) in the example illustrated in FIG. 21 to a value $150 \times 360/45 \times 2000 = 0.6$ by simply decreasing the gas pressure $P_b$ in the suppressor (or second chamber) from 2000 psi to 360 psi (and optimizing the delay as described), bringing the $P_2/P_o$ ratio from 65% to less than 10%.

The maximum radius $R_m$ of the bubble 1 is known to increase with the pressure $P_a$ of the gas in the generator (or first chamber). Therefore, by simply varying the pressure $P_a$ of the generator, one can vary the ratios $L/R_m$ and the relationship $Eb/_{Ea} = PbVb/_{PaVa}$. This process may be seen by the examples illustrated in FIGS. 22 and 24. As illustrated, by decreasing the pressure $P_a$ of the generator from 2000 psi (FIG. 22) to 1400 psi (FIG. 24), the $P_2/P_o$ ratio is dramatically reduced.

The maximum radius $R_m$ is also known to decrease when the hydrostatic pressure $P_H$, or the firing depth, increases, but this variation with depth is comparatively slow. Further, the difference in hydrostatic pressure does not affect the tuning of bubbles 1 and 2 in the usual range i.e. 1.5M-15M; therefore, only the delay Td should be changed.

Advantages

1. Extended Power Spectrum—Single Point Source

In addition to having advantages in the pressure-time domain, my novel acoustic source 10 also has very important advantages in the power spectrum-frequency domain. By measuring the pressure signature with a detector positioned close to source 10, for example one meter below the source, it is possible to construct a pressure-time signature for known first generator 10' operating alone (FIG. 11), and for my source 10 operating in conjunction with a second generator 10" (FIG. 13), as well as their corresponding power spectra for first generator 10' (FIG. 12) and for generators 10' and 10" operating consecutively (FIG. 14).

It will be observed from a detailed comparison of the pressure plots (FIGS. 11, 13) and power spectra plots (FIGS. 12, 14) that:

the uneven power spectrum (FIG. 12) for generator 10' is such that at some frequencies the amplitude of the spectrum is maximum, while for other frequencies, in the useful range, the amplitude of the spectrum is near zero;

the power spectrum (FIG. 14) for my acoustic source 10 extends from 6 Hz to 125 Hz and is relatively smooth over the entire useful frequency range, resulting in better resolution and signal-to-noise ratio;

my acoustic source 10 can be considered a point source because it produces a single, sharp, narrow-width pressure impulse $P_o$ (FIGS. 4, 13) and a relatively flat power spectrum curve (FIG. 14) from 6 Hz to 125 Hz;

the high frequency content of my emitted single pressure impulse $P_o$ is very useful to the geophysicists for improving the discrimination of closely-spaced events and for providing better resolution at all depths;

the low-frequency content of my emitted impulse $P_o$ is extremely important to the geophysicists because the absorption of the earth varies exponentially with the frequency, i.e., the lower the frequency the less the earth will absorb the seismic impulses and the deeper the penetration will be; and the peak of the power spectrum (FIG. 14) for my acoustic source 10 is positioned at a much lower frequency, as compared to the position of the peak of the power spectrum for the known first generator 10' operating without my second generator 10''. This shift in the position of the spectrum peak toward a lower frequency is also of great benefit to geophysicists.

2. Arrays

Because they are not point sources, conventional acoustic sources, such as generator 10', that generate secondary pulses have to be deployed in tuned arrays which use sources of different sizes in order to reduce the amplitudes of the individual bubble trains in the vertical and orthogonal planes. In other directions, and particularly the horizontal planes, such arrays detune, while in certain other directions the bubble energy will become additive.

In contrast, my single-point, high-energy acoustic source 10 can be used alone or several identical sources 10 can be used to construct a very efficient tapered array.

As distinguished from known acoustic generators 10' which produce wavelets, no tuning and no bubble cancellations are required when an array is built using a number of my identically-sized acoustic sources 10.

The pressure signature produced by an array using my sources 10 will have the same shape as the pressure signature (FIG. 13) of the individual sources 10 except for amplitude. There will be a linear summation of the individual impulse amplitudes (bar-meters), and the composite energy of the array will become proportional to $n^2$, where n is the number of sources 10 used to construct the array.

Because the shapes of the pressure signature and of the power spectrum of an array produced by a plurality of my identical sources 10 are the same as those of the individual sources 10 forming the array, except for amplitude, if one source 10 becomes inoperative in my array, no change will occur either in the shape of the pressure signature or in the shape of the power spectrum of the array, except for a change in amplitude.

Since the sharp impulses emitted by my acoustic sources 10 are of minimum phase, processing of the gathered seismic data is greatly simplified.

Being able to use identical seismic acoustic sources 10 in order to construct a tapered array will greatly simplify their maintenance and will alleviate the inventory problem associated with carrying a wide range of spare parts on the seismic vessel.

Because breakdown of a single conventional airgun 10' in a conventional array will detune the array and cause a substantial change in the shape of the pressure signature produced by the array, there is a need when using a conventional array to stop the seismic vessel, pull out the defective array, replace the defective airgun or airguns 10' in the array, return the array into the water, and then continue with the seismic survey, all of which is very costly to the user of the seismic vessel.

The loss of one or more of my acoustic sources 10 in my array will not detune the array and the seismic survey can continue without stopping.

3. Practical Considerations

Thus, my acoustic impulse source 10 can make use of conventional seismic generators such as airguns 10', and can be operated in conjunction with already existing seismic vessels, without requiring any major modifications thereto.

The cost of constructing and operating my novel energy sources 10 is only a fraction of the corresponding costs involved in constructing and operating arrays using conventional inefficient seismic energy sources 10', or such systems as are described in the illustrative patents listed in the background section of this specification. The energy needed to operate by my source 10 is small compared to the energy used by the prior art arrays constructed from known sources 10'.

The firing chambers which now exist on airguns can be welded or otherwise fixedly secured to each other back-to-back, but care must be taken to ensure that the volumes for the first generator 10' and for the second generator 10'' comply with the conditions above. Source 10 yields acceptable results: $P_2/P_o = 11\%$ with only 30 in$^3$ for the second chamber 14' and 45 in$^3$ for the first chamber 14.

The needed distance between the centers of ports 16, 16' can be obtained by interposing spacers between the present firing chambers to extend the distance so as to arrive at about twice the maximum radius of bubble 1.

In the conventional array of air guns 10', in order to achieve 50 bar-m (0–125 hz) one needs about 3000 in$^3$ of air per shot at 2000 psi, which means that the total power of the compressor should be around 1000 hp.

For the same output of 50 bar-m, the present source 10 requires 600 hp instead of 1000 hp.

It will be appreciated that the objects set forth above have been accomplished, while other advantages and modifications will become apparent to those skilled in the art.

Although the present invention has been described with respect to several embodiments, it is to be understood that various modifications may be made thereto within the spirit of the invention, as defined in the appended claims.

For example, the air guns 10' and 10'' described here are known to give an almost spherical bubble centered on the ports. If other such generators are used that produce a bubble less spherical and/or not centered on the ports, it will be obvious to those skilled in the art that some corrections should be introduced to optimize the results.

In addition, although the present disclosure utilizes the first maximum volume of bubble 1, it will be obvious to those skilled in the art that the method can be applied to suppress the bubble oscillations after the second maximum volume of bubble 1. Doing so will more than double the acoustic energy of the pulse (from 40% of the energy of the total signature to more than 80%.)

The resulting wavelet will have two pressure pulses: the primary pulse and the first bubble pulse, but when filtered in the range 0–20 $H_z$ for instance, which is the useful range for deep penetration, the wavelet has attractive characteristics: double energy and relatively short length, i.e. less than 100 msec.

What is claimed is:

1. A marine acoustic source for generating impulsive acoustic signals in a body of water, comprising:
    a signal chamber containing a first change of a highly compressed gas;
    a normally-closed first fast-acting valve means normally maintaining said signal chamber closed and having discharge port means into the water;
    a second chamber containing a second change of a highly compressed gas;
    a normally-closed second fast-acting valve means normally maintaining said second chamber closed and having outlet means into the water; and
    control means for explosively opening said first valve means so as to release said first charge and thereby generate at a first point within said body of water an impulsive acoustic signal and a first bubble, and for subsequently opening said second valve means to thereby release said second charge from said second chamber through said outlet means and into said water while said first bubble is substantially at its maximum volume such that the first bubble interacts but does not coalesce with the second bubble.

2. The marine source of claim 1, wherein said second valve means is adapted to be opened immediately after said body of water starts to implode said first bubble.

3. The marine source of claim 1, wherein the release of said second charge generates a second bubble at a second point within said body of water, said second bubble having substantially the same volume as said first bubble, and the distance between said first and said second points being about between one and two times the maximum radius of said first bubble.

4. The marine source of claim 3, wherein said first valve means is a first airgun, and said second valve means is a second airgun; and means maintaining the ports and outlets of said airguns separated by a distance which is substantially between one and two times the maximum radius of said first bubble.

5. The marine source of claim 4, wherein the release of said second charge generates a second bubble at a second point within said body of water, said second bubble having substantially the same maximum radius $R_m$ as said first bubble at a distance L between the points of release of said first and second charges, such that the ratio $L/R_m$ has a value within a range of about 1–2.

6. An explosive-type, bubble-free acoustic apparatus for use in a body of water, said apparatus comprising:
    a signal generator and a bubble-suppression generator;
    each one of said generators including: a chamber for receiving pressurized gas, discharge ports, and a movable shuttle valve for controlling said ports;
    each shuttle valve having a main piston for opening and closing said discharge ports and allowing them to communicate directly with its associated chamber, a control piston for controlling the movements of said main piston, and a hollow shaft having an axial bore therethrough, for maintaining said pistons in spaced relation;
    a solenoid-operated valve for controlling the actuation of each shuttle valve;
    the shuttle valve of said signal generator being adapted to explosively discharge pressurized gas from its associated chamber through the signal generator's discharge ports and into the surrounding body of water, said discharged gas producing a desired primary pulse and a first bubble capable of undergoing a series of implosions and explosions having an oscillating period T and emitting undesirable secondary pulses of decreasing amplitude;
    delay means for delaying the discharge of pressurized gas from the chamber in the suppressor generator through the discharge port of the suppressor generator and into said body of water until said first bubble reaches substantially its maximum volume at a time substantially equal to T/2, so as to generate a second interacting but non-coalescing bubble.

7. The acoustic apparatus of claim 6, wherein said signal generator and said bubble suppressor are arranged such that the major axis of both the generator and the suppressor are in substantial alignment with each other.

8. The acoustic apparatus according to claim 6, further including a casing defining therein said signal generator's chamber and said suppressor's chamber.

* * * * *